Sept. 10, 1940.  F. L. HUNTER, JR  2,213,961
LIQUID LEVEL INDICATOR AND/OR CONTROL
Filed Feb. 25, 1937
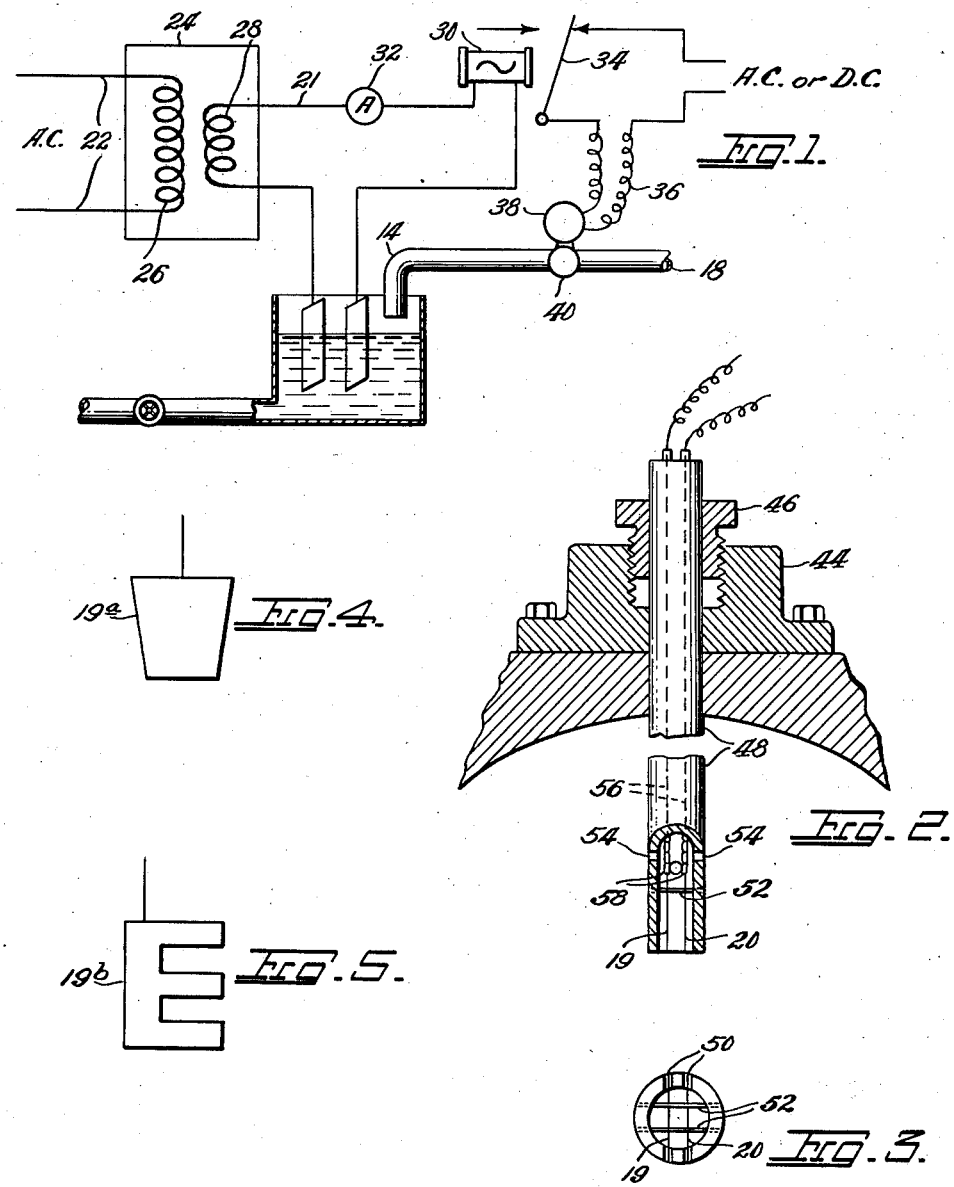

Patented Sept. 10, 1940

2,213,961

UNITED STATES PATENT OFFICE 2,213,961

LIQUID LEVEL INDICATOR AND/OR CONTROL

Frederick L. Hunter, Jr., Lake Bluff, Ill., assignor to Fansteel Metallurgical Corporation, North Chicago, Ill., a corporation of New York Application February 25, 1937, Serial No. 127,806

2 Claims. (Cl. 177—311)

This invention relates to a liquid electrolyte level indicator and/or control, which operates directly on an electric current proportional to the liquid level.

It is an object of my invention to provide a liquid electrolyte level indicator or control which is rugged, dependable, unaffected by non-conductive suspended matter in the electrolyte, relatively insensitive to changes in concentration of the electrolyte, and without any corrodible or moving parts exposed to the liquid electrolyte.

My invention provides a liquid electrolyte level indicator and/or control which depends for its operation on the capacitance of film-forming metal plates wholly or partially immersed in the electrolyte; the capacity being proportional to the degree of immersion of the plates in the liquid. Suitable film-forming metals are, for example, tantalum, columbium, aluminum, bismuth and magnesium, although I particularly prefer tantalum because of its high capacitance per unit area and its superior resistance to chemical attack. Tantalum is not measurably corroded at normal operating temperatures by any acids except hydrofluoric and fuming sulphuric.

Due to the high capacity of the film-forming metal plates employed in my invention a large current can be employed sufficient to operate any necessary indicating and/or control devices without the assistance of the usual multiplying appurtenance such as vacuum tube circuits, etc.

Another advantage of my invention is that only low voltage is employed, thereby avoiding the risks incident to the use of high voltages.

There is no electrolytic action taking place; wherefore, neither the electrodes are ever injured nor is the solution contaminated.

My invention operates without the production of any erosive gases and the attendant hazards.

By the employment of my preferred tantalum electrode capacity film upon the electrode is self-healing, thereby obviating the necessity for frequent repairs.

Other objects and advantages of my invention will appear as the description of the invention progresses.

The invention will be understood more readily in the detailed description thereof taken in connection with the accompanying drawing, in which—

Fig. 1 is a schematic indication of the circuit connections of the various elements of my liquid level indicator or control.

Fig. 2 is a partial sectional view of a storage tank in which my invention is installed.

Fig. 3 shows the lower plane view of a part of Fig. 2, and

Figs. 4 and 5 show alternate methods of construction of a part of Fig. 2.

In Fig. 1 at 10 there is indicated the body of electrolyte contained in vessel 12 provided with inlet 14 and outlet 16. It may be assumed, for example, that it is desired to withdraw electrolyte at will from outlet 16 replenishing the body 10 from its source at 18 in order to keep the liquid level substantially constant.

Immersed in the electrolyte are two plates 12 and 20 of film-forming metal such as tantalum. A control circuit 21 embodying these plates, includes a source of alternating current power 22, a transformer 24, to reduce the impressed voltage to about 40 volts, and a relay 30. If an indicating device is required, ammeter 32 is included in the circuit.

Plates 19 and 20 in the electrolyte 10 function as a relatively high capacity condenser, the capacity being proportional to the depth of immersion of the plates. As the level rises and the capacity increases, greater amounts of current are permitted to flow through the secondary 28 of transformer 24 and the relay 30 is operated to throw switch 34 in the power circuit 36 thereby actuating any suitable motor device 38 for closing valve 40 cutting off the source of liquid supply 18.

When the level drops, the capacitance and current are reduced, opening the relay, throwing the switch and again actuating the motor 38, this time opening the valve.

By the choice of a suitable relay, minor normal fluctuations in the primary voltage 26 do not materially affect the operation of the device as a level regulator. For level indication, a suitable transformer eliminates the effect of change in voltage. Changes in concentration of the electrolyte, except in a few restricted ranges, have little effect on the capacity, and may, therefore, ordinarily be neglected or compensated.

In Figures 2 and 3 I have shown the application of my device to liquid level indication and/or control in an electrolyte storage vessel. The vessel may be constructed of any suitable material not affected by the liquid to be stored. On an opening in the vessel there is mounted a stuffing box 44, provided with a packing nut 46. Slidably engaged by the stuffing box is a tube 48 sealed at its upper end. At the lower end of the tube 48 two tantalum plates 19 and 20 are held in slots 50 by means of pin 52 passing through the tube 48 of non-conducting material and plates 19 and 20.

Holes 54 may be provided in the tube for equalizing the liquid level within the tube. From the plates 19 and 20 tantalum lead wires 56 insulated by ceramic beads 58 pass out the upper end of tube 48 to be connected in any suitable manner with circuit 21.

In order to obtain more abrupt changes in capacity with corresponding changes in level, thereby enabling me to use more suitable instruments, I may employ plate 19a of tapering shape, shown in Figure 4, or comb-shaped plate 19b, shown in Figure 5.

Although in the drawing and the above description I have disclosed specific details which show the preferred embodiments of my invention, it is to be understood that various modifications are contemplated and the invention should therefore be limited merely by the scope of the appended claims.

Having thus described my invention, what I claim as new and desire to secure by Letters Patent of the United States, is—

1. A level indicator for acid electrolytes including a source of alternating current power, two adjacent, spaced apart tantalum plates arranged in the electrolyte so that they will be immersed in proportion to the change in liquid level, an electrical connection from one side of the source of power to one of the tantalum plates and another electrical connection from the other side of the source of power to the second tantalum plate, the last mentioned connection having in circuit an ammeter.

2. A level responsive means for electrolytes including a source of alternating current power, two adjacent, spaced apart plates of film-forming metal arranged in the electrolyte so that they will be immersed in proportion to the change in liquid level; an electrical connection from one side of the source of power to one of the metal plates, and another electrical connection from the other side of the source of power to the second metal plate, the last mentioned connection having in circuit a current responsive means.

FREDERICK L. HUNTER, Jr.